US012779707B2

(12) United States Patent
Ljunggren

(10) Patent No.: US 12,779,707 B2
(45) Date of Patent: Nov. 3, 2026

(54) TROUGH MANIPULATOR AND METHOD FOR LIFTING OBJECTS AND TROUGH

(71) Applicant: OCADO INNOVATION LIMITED, Hatfield (GB)

(72) Inventor: Per Henrik Ljunggren, Bromma (SE)

(73) Assignee: OCADO INNOVATION LIMITED, Hatfield (GB)

(*) Notice: Subject to any disclaimer, the term of this patent is extended or adjusted under 35 U.S.C. 154(b) by 368 days.

(21) Appl. No.: 18/042,908

(22) PCT Filed: Aug. 24, 2021

(86) PCT No.: PCT/EP2021/073371

§ 371 (c)(1),
(2) Date: Feb. 24, 2023

(87) PCT Pub. No.: WO2022/043317

PCT Pub. Date: Mar. 3, 2022

(65) Prior Publication Data

US 2023/0321844 A1 Oct. 12, 2023

(30) Foreign Application Priority Data

Aug. 26, 2020 (SE) .................................... 2050982-4

(51) Int. Cl.
*B25J 15/06* (2006.01)
*B65G 47/90* (2006.01)
(Continued)

(52) U.S. Cl.
CPC ........ *B25J 15/0616* (2013.01); *B65G 47/907* (2013.01); *B65G 47/918* (2013.01); *B65G 61/00* (2013.01)

(58) Field of Classification Search
CPC .... B65G 47/907; B65G 47/918; B65G 61/00; B25J 15/0408; B25J 15/0441; B25J 15/0641; B25J 15/0616; H01L 21/6838
(Continued)

(56) References Cited

U.S. PATENT DOCUMENTS 3,610,673 A 10/1971 Strombeck et al.
3,860,280 A 1/1975 Karlsson
(Continued)

FOREIGN PATENT DOCUMENTS

GB 1268078 A 5/1969
JP S53119180 A 10/1978
(Continued)

OTHER PUBLICATIONS

Office Action (Examination Report No. 2) issued on Oct. 23, 2024, by the Australian Patent Office in corresponding Australian Patent Application No. 2021334951. (3 pages).
(Continued)

*Primary Examiner* — Gerald McClain
(74) *Attorney, Agent, or Firm* — Gregory Matt McCloskey

(57) ABSTRACT

A manipulator is described for lifting objects positioned within an upwards open container. The manipulator includes a first engaging device for a first object and a second engaging device for engaging a second object. A mechanism is provided to force the first and second objects, causing them to exert an internal force on the container. This internal force enables the container to be lifted by frictional engagement with the objects. A robot including the manipulator and a corresponding method for lifting the objects and container is also encompassed.

22 Claims, 3 Drawing Sheets

(51) Int. Cl.
*B65G 47/91* (2006.01)
*B65G 61/00* (2006.01)

(58) Field of Classification Search
USPC .................................................. 294/183, 188
See application file for complete search history.

(56) References Cited

U.S. PATENT DOCUMENTS

| | | | | | |
|---|---|---|---|---|---|
| 4,729,209 | A * | 3/1988 | Owensby | B31B 50/81 53/449 |
| 5,943,842 | A * | 8/1999 | de Koning | B65B 35/38 53/247 |
| 8,944,745 | B2 * | 2/2015 | Fujiwara | B23P 19/001 414/749.5 |
| 10,479,619 | B2 * | 11/2019 | Mochizuki | B25J 15/0616 |
| 10,814,459 | B2 * | 10/2020 | Borowicz | B25J 15/0616 |
| 2010/0123325 | A1 * | 5/2010 | Maffeis | B25J 15/0226 294/199 |
| 2015/0357062 | A1 * | 12/2015 | Allison | B25J 15/0047 294/195 |
| 2016/0264364 | A1 * | 9/2016 | Schenning | B25J 15/0071 |
| 2019/0047787 | A1 * | 2/2019 | Fosnight | B66C 1/445 |
| 2019/0111649 | A1 * | 4/2019 | Johnson | B31B 50/005 |
| 2019/0247983 | A1 | 8/2019 | Borowicz | |
| 2023/0356984 | A1 * | 11/2023 | Johannisson | B66C 13/46 |
| 2024/0308762 | A1 * | 9/2024 | Johannisson | B65G 1/0464 |

FOREIGN PATENT DOCUMENTS

| | | | |
|---|---|---|---|
| JP | S60172487 | A * | 9/1985 |
| JP | H05229650 | A | 9/1993 |
| KR | 101153902 | B1 | 6/2012 |
| NO | 133886 | B | 4/1976 |
| SE | 454350 | B | 4/1988 |

OTHER PUBLICATIONS

Office Action issued on Jun. 12, 2024, by the Canadian Patent Office in corresponding Canadian Patent Application No. 3,192,088. (4 pages).

Office Action (Examination Report No. 1) issued on Mar. 25, 2024, by the Australian Patent Office in corresponding Australian Patent Application No. 2021334951. (4 pages).

International Search Report (PCT/ISA/210) and Written Opinion (PCT/ISA/237) mailed on Nov. 30, 2021, by the European Patent Office as the International Searching Authority for International Application No. PCT/EP2021/073371. (12 pages).

Search Report dated May 30, 2022, issued by the Swedish Patent Office in corresponding Application No. 2050982-4. (6 pages).

Examination Report issued on Mar. 19, 2025 by the European Patent Office in corresponding European Application No. 21769375.3 (5 pages) corresponding to Applicant's U.S. Appl. No. 18/042,908.

Office Action issued on Apr. 9, 2025 by the Korean Patent Office in corresponding Korean Application No. 10-2023-7010007 (10 pages) corresponding to Applicant's U.S. Appl. No. 18/042,908.

Office Action issued on May 17, 2025 by the Chinese Patent Office in corresponding Chinese Application No. 202180052319.7 (20 pages) corresponding to Applicant's U.S. Appl. No. 18/042,908.

Office Action issued on Nov. 28, 2025 by the Canadian Patent Office in corresponding Canadian Application No. 3192088 (4 pages) corresponding to Applicant's U.S. Appl. No. 18/042,908.

* cited by examiner

TROUGH MANIPULATOR AND METHOD FOR LIFTING OBJECTS AND TROUGH

TECHNICAL FIELD

The present disclosure generally pertains to the field of automated handling of objects, and in particular to lifting objects in an upwards open container, such as a trough.

BACKGROUND

Generally, within industries such as manufacturing and distribution, there is a need to provide solutions for automated handling of various objects.

One example of objects that present challenges as regards automated handling are those that are arranged in an upwards open container, when not only the objects but also the container is to be lifted. Prior art solutions either fail to securely lift the container, or are complex and expensive.

Objects of the embodiments of the present disclosure include obviating or at least mitigating the above disadvantages of prior art.

SUMMARY

Accordingly, there is provided a manipulator for lifting objects and an upwards open container within which the objects are at least partly arranged. The manipulator comprising a first object engaging device for engaging a first object a second object engaging device for engaging a second object, and separating means for forcing the first and second objects apart when engaged by the first and second object engaging devices. Thus, the objects may exert an internal force on the container.

Advantageously, by such a manipulator not only the objects can be securely lifted but also the container for the objects. In particular, the objects and the container may be lifted without the manipulator directly engaging or coming into contact with the container. In this way, the manipulator may be designed with a footprint smaller than the container to be lifted. The manipulator of the present disclosure is cost-effective as regards its components, assembly and maintenance. It is also reliable and sturdy. Furthermore, by using the objects per se for lifting the container, no separate means are required for lifting the container and the location of the sides on the containers need not be known. Also, the manipulator does not require high manufacturing tolerances as regards the objects or the container, relatively large size deviations are allowed.

As the objects exert an internal force on the container, the container may be lifted by means of the objects by frictional forces between the objects and the container.

The container may be tray or trough, typically made from corrugated cardboard. The objects may e.g. be essentially box-shaped or cylindrical. The objects may be cartons containing products or may be a number of, such as four, packs of cans, such as plastic or paper wrapped six-packs of cans.

Preferably, the separating means is configured to force the first and second objects apart at least partly in a horizontal direction.

Preferably, the separating means is configured to force the bottom of the first and second objects apart. The objects will then exert an internal force on a lower part of the container where the upwards open container has a high strength. Furthermore, also a container with a low height, only surrounding a bottom portion, such as the lower tenth of the objects, may be lifted by the objects.

Preferably, the separating means is configured to rotate the first and second objects around a respective horizontal axis, i.e. axes in a horizontal plane. Said axes are preferably located above the object, and more preferably above the object engaging devices. In this way, a large translatory movement of the objects is obtained.

The separating means may be configured to force the first and second objects apart by translatively and/or rotatively moving the first and/or second object engaging device. The rotation may occur around a horizontal or vertical axis.

The separating means may be configured to force the first and second objects apart at least partly by means of the weight of at least one of the objects. The weight of the objects then advantageously function to activate the manipulator to exert an internal force on the container. The separating means may for this reason be flexible, in addition, the separating means may by suspended at points horizontally distanced from where the weight of the objects affect the separating means. As a result, the separating means may deform by the weight of the object lifted by the manipulator.

Preferably, the separating means carries at least one of the object engaging devices. The object engaging devices may be attached to the separating means. The object engaging devices may be rotationally firmly attached to the separating means, such that a rotation of a portion of the separating means can be transferred to a rotation of the object engaging devices. Preferably, the object engaging devices are rotationally firmly attached to the separating means, such that the separating means can transfer torque to the object engaging devices. A rotation of a portion of the separating means may be the result of a deformation of the separating means.

The object engaging devices may e.g. be configured to engage the objects by under-pressure or magnetic force. Preferably, the object-engaging devices are configured to engage the topside of the objects, preferably exclusively the topside and not the underside nor the lateral sides of the objects. The objects engaging devices may be vacuum suction grippers or electromagnets.

Preferably, the separating means is a flexible member configured to deform by the weight of the object lifted by the manipulator.

Preferably, the manipulator further comprises a hoist member adapted to carry the separating means. The hoist member may be the member that connects manipulator to the structure, e.g. a robot, that handles the manipulator. For this reason, the hoist member may comprise attachment means, such as e.g. apertures or brackets, by means of which the hoist member can be attached to e.g. a robot.

The separating means may alternatively be referred to as a carrier member or an object engaging device carrier.

Preferably, the manipulator further comprises connection means connecting the hoist member and the separating means to each other in a manner allowing the separating means to deform by the weight of the object lifted by the manipulator. The separating means may be suspended below the hoist member by means of the connection means.

Preferably, the separating means and/or the hoist member is/are plate-shaped element(s). In alternative, one or both may be bar-shaped, rod-shaped, or formed from a grid of bars or rods.

Preferably, the separating means has an extension in two orthogonal horizontal directions. Such a separating means may carry an array of object engaging devices and may separate at least two object engaging devices along two horizontal directions. The objects may then exert internal forces in two directions on the container, and even more securely lift the container.

The manipulator may comprise a contact sensor for determining contact between the manipulator and an object.

The contact sensor may also determine contact between the container carried by the manipulator and a surface on which the container is to put down.

Preferably, the contact sensor is configured to sense the distance between the separating means and the hoist member.

The contact sensor may be configured to determine whether the separating means and the hoist member are positioned at a first or at a second distance from each other. Such a contact sensor may be of sturdy and simple design. The contact sensor may comprise a sensor body and a movable sensor element, which is movable with respect to the sensor body.

The contact sensor, or a movable sensor element thereof, may be arranged between the separating means and the hoist member.

Preferably, the footprint of the manipulator is smaller than the footprint of the container to be lifted. By such configuration, the manipulator will be able to lift the objects and the container also when there are obstacles located next to the container at all sides. Also, the manipulator will be able to place the objects and the container directly adjacent to another container or other item, such as a wall. The manipulator is preferably configured to be able to lift the objects and the container by engaging only the topside of at least two objects.

Preferably, the first object is engaged by at least two first object engaging devices and the second object is engaged by at least two second object engaging devices. With such a configuration, the first and second objects may be more effectively forced apart. In particular, a rotation may effectively be transferred from the separating means to the objects. Furthermore, the object engaging devices need not be rotationally firmly attached to the separating means.

Preferably, the manipulator is carried by a robot. The robot will then be able to lift objects together with an upwards open container within which the objects are at least partly arranged. The robot may be attached to the hoist member.

There is further provided a method for lifting objects and an upwards open container within which the objects are at least partly arranged. The method comprises the steps of engaging a first object, engaging a second object, securing the container to the first and second objects by forcing apart the first and second objects, and lifting the objects and the container.

The advantages of the method correspond to what has been described above in relation to the manipulator. The method may involve steps corresponding to the above-mentioned features of the manipulator.

The container may be secured to the first and second objects by rotating at least one object. The object may be rotated 0.5-5 degrees, preferably 1-3 degrees. The rotation preferably occurs around a horizontal axis. The rotation preferably occurs around a horizontal axis located above the object.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION OF EMBODIMENTS

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art.

Figure 1:
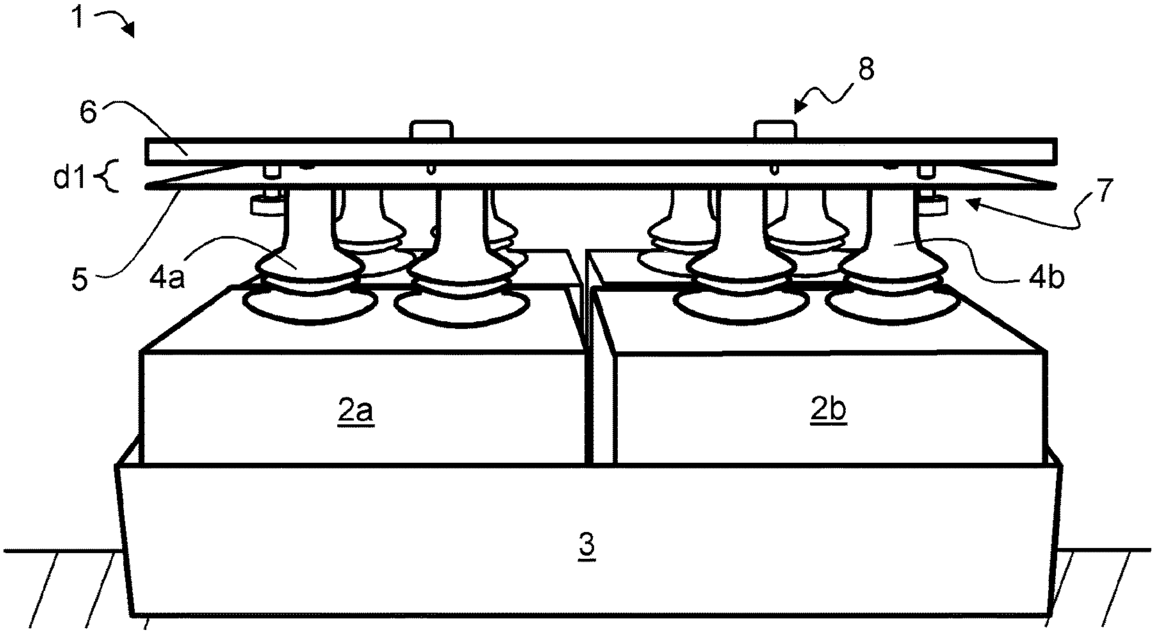
FIG. 1 is a perspective side view of a manipulator and four objects arranged in an upwards open container in form of a trough that stands on a surface, FIG. 2 corresponds to FIG. 1, but with the manipulator lifting the objects and the trough.
Figure 2:
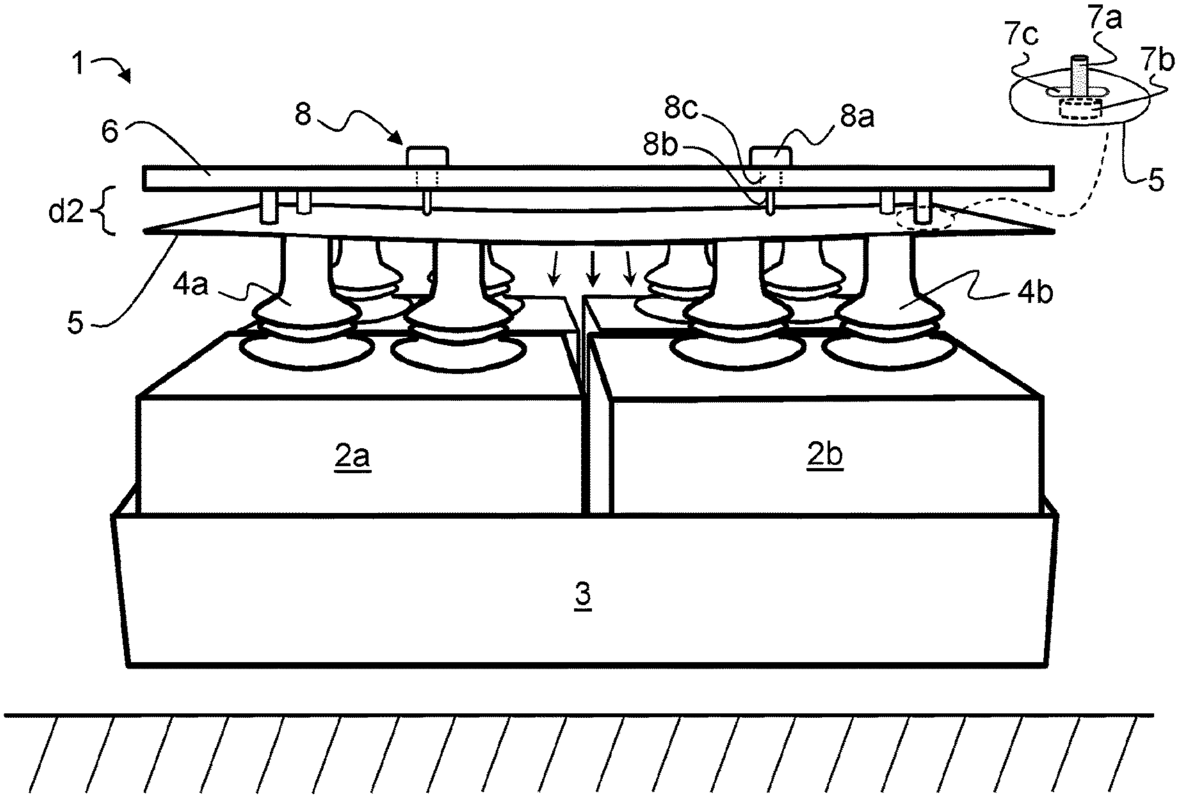

FIGS. 1 and 2 illustrate a manipulator 1 comprising eight suction cups 4*a*, 4*b* (only two of which have been furnished with reference numerals) attached to a separating means 5 which is carried by a hoist member 6 by means of four connection means 7. Two contact sensors 8 are provided to sense the distance between the separating means 5 and the hoist member 6.

The manipulator is configured for lifting an upwards open container 3, in this example a tray or a trough, more precisely a corrugated cardboard trough, together with four objects 2*a*, 2*b* (only two of which have been furnished with reference numerals).

The objects 2*a*, 2*b* illustrated as elongated boxes may be for example wrapped packs of cans or cartons containing products. The container 3 has a base that is sized accommodate the four objects 2*a*, 2*b* and sidewalls of a height approximately half that of the objects. The container sidewalls extend slightly inclined with respect to the vertical direction. The container top is open and due to the inclined side walls slightly larger than the container base, such that the objects 2*a*, 2*b* may easily be inserted into container 3. As will be understood, the present disclosure is not limited to the specific form of the objects or the container shown in FIGS. 1 and 2. In particular, the container may be box-shaped with an open top, such as a cardboard box with no lid or with an open lid. The container may alternatively be made of e.g. plastic material or thin-walled metal.

In FIG. 1, the manipulator 1 is positioned above—in the sense of the illustration in FIG. 1—the objects 2*a*, 2*b* with the suction cups 4*a*, 4*b* in contact with the objects 2*a*, 2*b*. There is a first, front left, suction cup 4*a* in contact with a first, front left, object 2*a* and a second, front right, suction cup 4*b* in contact with a second, front right, object 2*b*. There are also corresponding first and second rear suction cups as well as first and second rear objects, which function in the same manner as the front ones. As can be seen, all four objects 2*a*, 2*b* are engaged by two suction cups 4*a*, 4*b* each in this example. By furnishing the suction cups with under-pressure by an air compressor device and suction hoses (not shown), the suction cups releasably attach to the objects. The suction cups may alternatively be referred to as vacuum suction grippers.

By the arrangement of two, or more, suction cups per object the objects may be more securely attached to. Plural suction cups per object may be particularly advantageous should the objects have an uneven or unpredictable top shape.

In FIG. 2, the manipulator 1 has been lifted upwards by a robot (not shown) or another lifting device. By means of the suction cups 4*a*, 4*b*, the manipulator 1 has lifted the objects 2*a*, 2*b* and the container 3. As will be explained, the container 3 has been lifted by means of the objects 2*a*, 2*b* interacting with the container 3.

The suction cups 4*a*, 4*b* are attached to the separating means 5, which is this embodiment is formed of a flexible plate. The separating means 5 may be formed of plastic material, composite material, or thin metal sheet, such as a thin steel sheet. The separating means 5 is flexible and configured to elastically deform when lifting the objects 2*a*, 2*b*. This deformation is shown in FIG. 2 and indicated by the three arrows positioned centrally beneath the separating means 5. In other embodiments, the separating means 5 may be formed of a flexible grid structure, such as a flexible grid of bars.

As is understood from a study of FIG. 2, the deformation of the separating means results movement of the suction cups 4*a*, 4*b* and thus the objects 2*a*, 2*b* being brought to engage the container 3 internally. Thus, when the separating means 5 is lifted, the container 3 will also be lifted. The objects 2*a*, 2*b* will be brought into engagement with the container 3 essentially simultaneously with the objects 2*a*, 2*b* being lifted vertically. More precisely, as the separating means is deformed or bent downwards, the suction cups 4*a*, 4*b* will rotate around a horizontal axis and thus rotate and translate the objects 2*a*, 2*b* to engage the opposing inner walls of the container 3. The objects 2*a*, 2*b* will be brought into engagement with the container 3 and lift the container 3 in one single lifting movement of the separating means 5.

In the embodiment shown in FIGS. 1 and 2 (and also FIGS. 3-5 described below) the objects 2*a*, 2*b* are rotated around horizontal axes above the objects 2*a*, 2*b*. By such an arrangement, the rotation results in a large movement of the bottom of the first and second objects.

In the embodiment of FIGS. 1 and 2, the separating means 5 is deformed—heavily exaggerated—into a bowl shape. As viewed from below, the lower surface of the deformed separating means 5 is convex when deformed. Thus, the suction cups 4*a*, 4*b* that are attached to the lower surface of the separating means 5 will be separated from each other. As a result, the respective objects 2*a*, 2*b* will be forced apart and against opposing inner walls of the container 3. The objects 2*a*, 2*b* may internally engage the container 3 by being forced horizontally apart.

As is apprehended by a study of FIG. 2, the provision on two suction cups per object, with the suction cups arranged at a distance from each other in a direction in which the deformation of the separating means chiefly occurs (the longitudinal direction of the separating means), the deformation of the separating means 5 will be effectively transformed into a rotation of the objects 2*a*, 2*b*.

The hoist member 6 is a rigid structure that carries the flexible separating means 5 by one connection means 7 arranged in each corner of the hoist member 6. The separating means 5 is suspended in a vertically movable way with respect to the hoist member 6. More precisely, the separating means 5 is vertically movable between a first and a second distance d1, d2, as will be described below.

Figure 5:
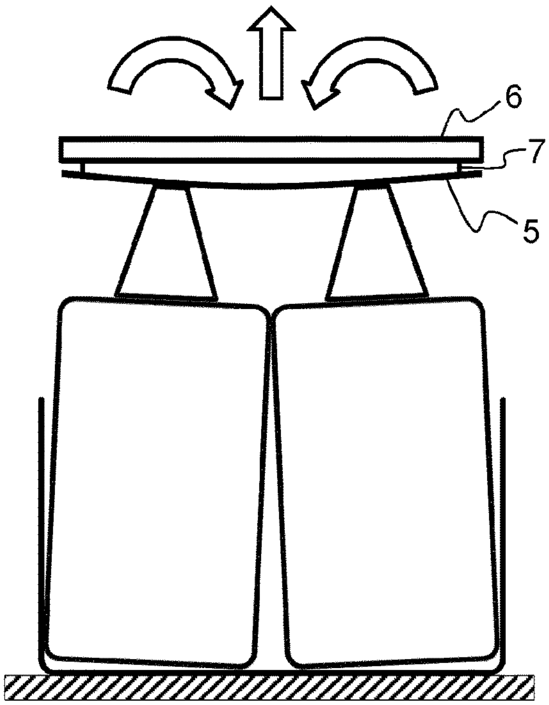

In other embodiments, see FIG. 5, there may be two connection means 7. In the embodiment of FIGS. 1 and 2, three connection means 7 arranged in a triangular pattern would in an alternative embodiment suffice for the hoist member 6 to carry the separating means 5.

In FIG. 1 the separating means 5 is in a first vertical position close to the hoist member 6. The separating means 5 is pushed towards the hoist member 6 by the contact with the objects 2*a*, 2*b*. In the first position, there is a first distance d1 between the hoist member 6 and the separating means 5.

In FIG. 2 the separating means 5 is in a second vertical position further away from the hoist member 6. The separating means is pulled away from the hoist member 6 by gravity. In the second position, there is a second distance d2 between the hoist member 6 and the separating means 5. The second distance d2 is larger than the first distance d1. The manipulator may be configured such that the separating means 5 can be moved into contact with the hoist member 6, which means that the first distance d1 may equal zero.

When the manipulator 1 carries the objects 2*a*, 2*b* and the container 3 as is shown in FIG. 2, and is subsequently lowered down to place the objects 2*a*, 2*b* and the container 3 at the desired location, the container 3 will make contact with the surface (e.g. a floor, a pallet or another object) and thus upon continued lowering the separating element 5 will be moved from the second distance d2 to the first distance d1.

In this embodiment, the connection means (generally denoted reference numeral 7), is formed of a bolt 7*a*, 7*b* screwed from the underside into the underside of the hoist member 6 with the bolt head 7*b* and the bolt shank 7*a* protruding downwards. The separating means 5 is hanging on the bolt head 7*b*. There is an elongated groove 7*c* in the separating means 5 through which the bolt 7*a*, 7*b* extends, see the cut-out in FIG. 2. The groove 7*c* has a length allowing the longitudinal extension of the separating means to vary, and also a width (exceeding the diameter of the bolt shank 7*a*) allowing the transverse extension of the separating means to vary.

In the embodiment shown in FIGS. 1 and 2, the hoist member 6 and the separating means 5 are both rectangular plate-shaped elements of approximately the same area, as viewed from above. The separating means 5 is suspended under the hoist member 6 by means of the connection means 7 arranged in each corner of the rectangular plate-shaped elements. The grooves 7*c* allow a certain horizontal movement of the separating means 5, resulting from the deformation of separating means 5. More precisely, as the separating means 5 deforms into a bowl shape, a certain horizontal movement of the corners of the separating means 5 is allowed by the connection means 7. The grooves 7*c* offer the bolts 7*a*, 7*b* a certain horizontal play both along the longitudinal direction of the separating means and along the transverse direction of the separating means. As an alternative to grooves, the separating means 5 may be furnished with essentially circular holes, and a large bolt head, or a large washer or similar, may support the separating means 5 and offer the required horizontal play such that the separating means may deform 5.

In an alternative embodiment (not shown), the connection means 7 may be configured to allow said vertical and horizontal movement in another way, the connection means may for example be flexible, e.g. a spring, or may be means able to hinder a tension force but not a compression force, e.g. a wire, a chain or a thread.

With continued reference to FIGS. 1 and 2, the manipulator may further comprise a contact sensor (generally denoted reference numeral 8) for determining contact between the manipulator 1 and an object 2*a*, 2*b*. The contact sensor 8 may also determine when the container 3 and its objects 2*a*, 2*b* make contact with a surface on which they are to be put down upon lowering the manipulator 1.

More precisely, the contact sensor 8 may determine whether the hoist member 6 and the separating means 5 are arranged at the first distance d1 or at the second distance d2 from each other.

In this embodiment, the contact sensor 8 is mounted to the hoist member 6. The contact sensor 8 comprises a sensor body 8*a* mounted on top of the hoist member 6 and a movable sensor element 8*b* that extends via a through-hole 8*c* (indicated by dotted lines in FIG. 2) in the hoist member 6 and protrudes out from the underside of the hoist member. The movable sensor element 8*b* is positioned between the hoist member 6 and the separating means 5.

In the present embodiment, the contact sensors 8 are positioned horizontally in-between the connection means 7, closer to the centre of the separating means 5 than are the connection means, which are located close to the corners of the separating means 5. By providing two contact sensors 8, one on each longitudinal side of the separating means 5, the contact sensors 8 can be used to detect an undesired oblique positioning of the separating means 5 in relation to the hoist member 6.

In the first position of the separating means (FIG. 1) the movable sensor element 8*b* is pushed into the sensor body 8*a* by the separating means 5, thus the contact sensor 8 registers that the hoist member 6 and the separating means 5 are arranged at the first distance d1 from each other.

In the second position of the separating means (FIG. 2) the movable sensor element 8*b* is not in contact with the separating means 5 and thereby not pushed into the sensor body 8*a* (optionally moved out of the sensor body by spring means), thus the contact sensor 8 registers that the hoist member 6 and the separating means 5 are arranged at the second distance d2 from each other.

In the present embodiments, there are two contact sensors 8. Should only one (e.g. the left) movable sensor element 8*b* be pushed in, an oblique positioning of the separating means 5 is detected.

A method for lifting objects and an upwards open container will now be described with reference to FIGS. 3*a* to 3*d*. This method is applicable to the manipulator shown in FIGS. 1 and 2.

Figure 3A:
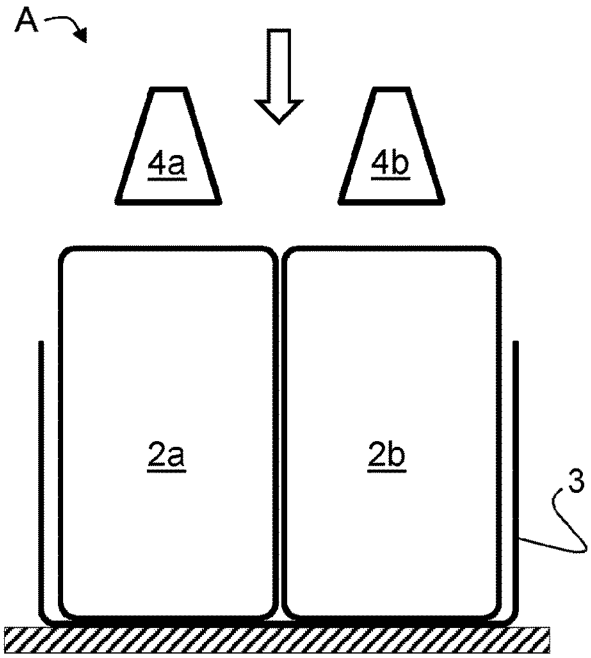
FIGS. 3*a*-3*d* illustrate, in schematic cross-sectional views, a method for lifting objects and an upwards open container, FIGS. 4-6 schematically illustrate alternative manipulators and alternatives to method step 3*c* in schematic cross-sectional views.

FIG. 3*a* illustrates a first step A in which the manipulator, out of which only a first and second suction cup 4*a*, 4*b* is shown, is lowered down towards a first and second object 2*a*, 2*b* in a container 3. It is to be understood that the manipulator comprises at least also the separating means 5, which in this embodiment may be formed of a flexible rod or bar (see FIG. 4 or 5).

In the first step A, should the manipulator 1 of FIGS. 1 and 2 be used, the hoist member 6 and the separating means 5 are arranged at the second distance d2 from each other.

Figure 3B:
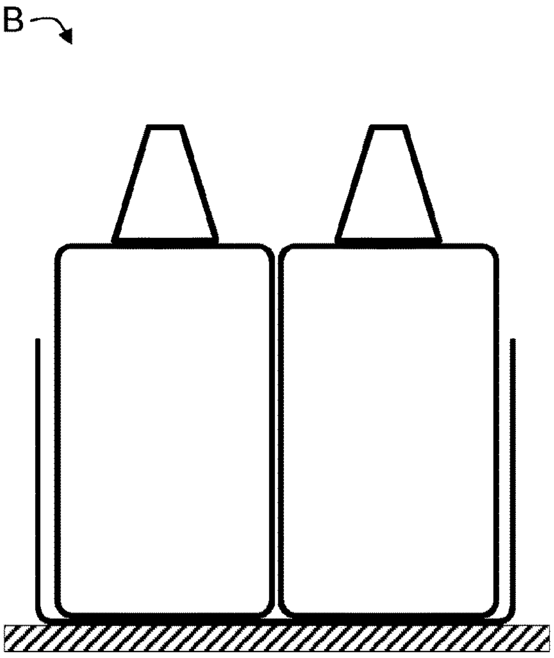

FIG. 3*b* illustrates a second step B in which the suction cups 4*a*, 4*b* releasably attach to the objects 2*a*, 2*b* by under-pressure. The first suction cup 4*a* attaches to the first object 2*a* and the second suction cup 4*b* attaches to the second object 2*b*.

In the second step B, should the manipulator 1 of FIGS. 1 and 2 be used, the hoist member 6 and the separating means 5 are arranged at the first distance d1 from each other.

Figure 3C:
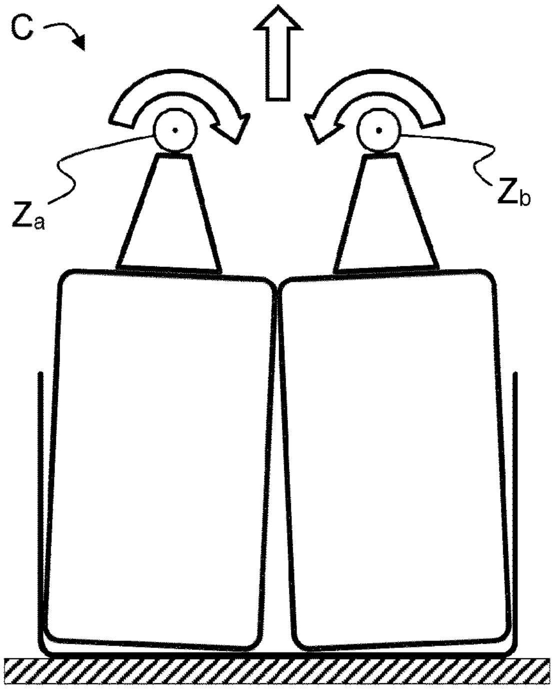

FIG. 3*c* illustrates a third step C in which the objects 2*a*, 2*b* are counter-rotated around a horizontal axis. The first suction cup 4*a* and the first object 2*a* are rotated clockwise whereas the second suction cup 4*b* and the second object 2*b* are rotated counter-clockwise. The suction cups 4*a*, 4*b* are rotated around horizontal axes $Z_a$, $Z_b$ (normal to the drawing plane).

These rotations may preferably be caused by the weight of the objects 2*a*, 2*b* and by the suction cups 4*a*, 4*b* being carried by a flexible separating means 5 as was described in connection with FIGS. 1 and 2. The optional lifting of the suction cups 4*a*, 4*b* is illustrated by an arrow in FIG. 3*c*. The manipulator may however in other embodiments (not shown) comprise other means for rotating or moving the suction cups 4*a*, 4*b*. As a result of the rotation, the lowermost edges of the objects 2*a*, 2*b* come to abut against and press against the lower opposing internal walls of the container 3. Also, the upper inner edges of the objects 2*a*, 2*b* may come to abut against and press against each other.

Figure 3D:
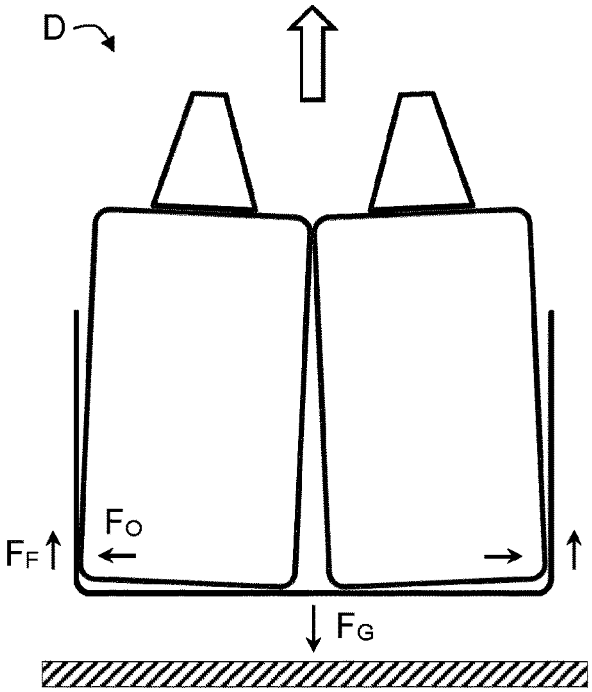

FIG. 3*d* illustrates a fourth step D in which the suction cups 4*a*, 4*b* lift the objects 2*a*, 2*b* and also the container 3. This is illustrated in FIG. 3*d* by the distance between the container bottom and the surface on which the container rests in FIGS. 3*a* to 3*c*. Should the manipulator 1 of FIGS. 1 and 2 be used, the hoist member 6 and the separating means 5 would again be arranged at the second distance d2 from each other.

FIG. 3*d* has been furnished with arrows indicating the forces acting on the container 3 when lifted by the manipulator 1. The container 3 is affected by gravitation $F_G$, by horizontal forces $F_O$ from the objects 2*a*, 2*b* and by vertical frictional forces $F_F$ from the objects' 2*a*, 2*b* engagement with the container 3. The horizontal forces $F_O$ from the objects act internally on the opposing inner container lateral walls in opposite directions, as is illustrated. These forces, although not illustrated, are present in all embodiments of this disclosure.

In a following step (not shown), the manipulator 1 may be lowered and place the objects 2*a*, 2*b* and the container 3 on a surface. In such a step, the container 3 contacting the surface may be registered by the above described contact sensor 8 (distance d1).

FIGS. 4 to 7 illustrate embodiments in which there are only two objects 2*a*, 2*b* and two suction cups 4*a*, 4*b*. FIGS. 4 to 7 mainly serve to illustrate alternatives as regards the method step C of FIG. 3. I.e., how the objects 2*a*, 2*b* may be forced apart to engage the container 3. However, FIGS. 4 to 7 also serve to demonstrate that the concept of the present disclosure is applicable to two objects, and it will be understood that there may be any number of objects arranged in one or more rows or in an arbitrary manner in the container.

Figure 4:
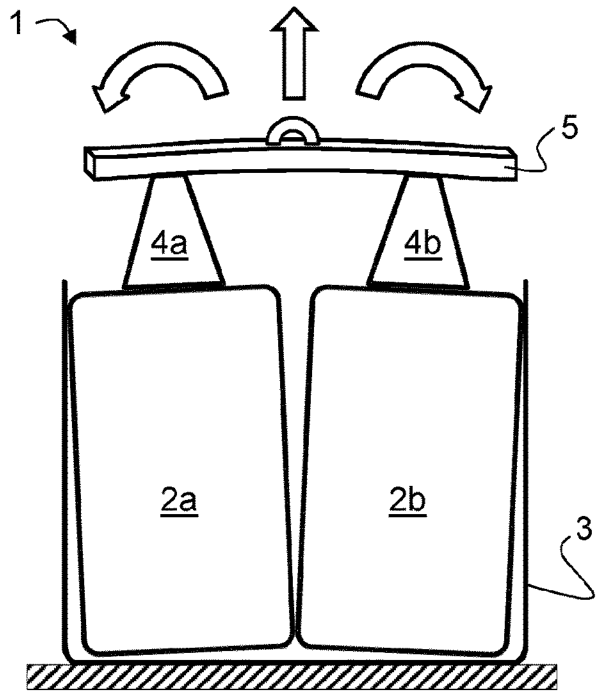

The embodiment of FIG. 4 schematically illustrates a manipulator 1 that comprises a first suction cup 4*a*, a second suction cup 4*b* and a separating means 5. The separating means 5 is a flexible bar and carries the suction cups 4*a*, 4*b*.

As is illustrated, the separating means 5 comprises an optional central lifting attachment, a lifting eye, for lifting the separating means, e.g. by a robot. When the separating means 5 is lifted centrally, its left and right ends bend downwards by the weight of the objects 2*a*, 2*b*. Then the first suction cup 4*a* and the first object 2*a* (left in FIG. 4) are rotated counter-clockwise whereas the second suction cup 4*b* and the second object 2*b* (right in FIG. 4) are rotated clockwise.

The embodiment shown in FIG. 4 involves the uppermost edges of the objects pressing against the upper opposing internal walls of the container 3. Such a solution may be advantageous in some situations, and works well with containers 3 having high sidewalls, e.g. sidewalls that extend to level with the uppermost edges of the objects of the container. In FIG. 4, the sidewalls of the container 3 are higher than the objects 2_a_, 2_b_.

The embodiment of FIG. 5 corresponds to the one of FIGS. 1 and 2 but in a version for lifting only a first and a second object 2_a_, 2_b_ and a container. This manipulator 1 comprises a first suction cup 4_a_, a second suction cup 4_b_, a separating means 5, a hoist member 6 and two connection elements 7. The separating means 5 is a flexible rod, in particular a plastic rod, and carries the suction cups 4_a_, 4_b_. The connection elements 7 may be realized as eyelets through which the flexible rod passes.

When deformed, the separating means 5 assumes a curved shape, the middle of the rod being bent downwards. Thus, the suction cups 4_a_, 4_b_ that are attached to the lower surface of the separating means 5 will be separated from each other, both rotationally and translatively.

Figure 6:
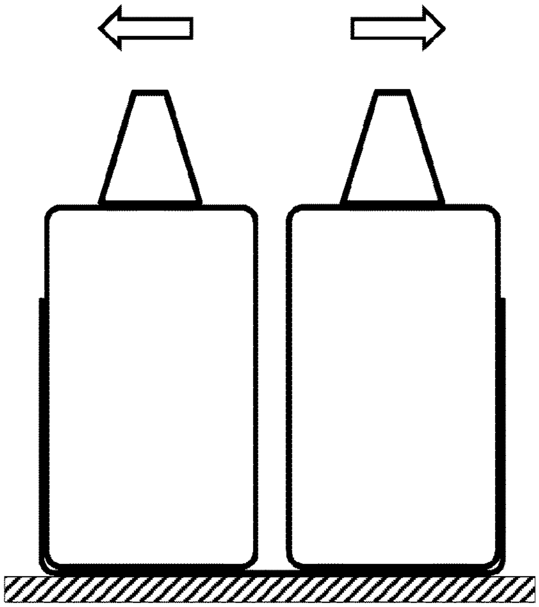

FIG. 6 schematically illustrates an embodiment where the suction cups 4_a_, 4_b_ and the objects 2_a_, 2_b_ are not rotated in order to internally press against and lift the container 3. Instead, the suction cups 4_a_, 4_b_ and thus the objects 2_a_, 2_b_ are only translatively moved away from each other to abut against the opposing inner walls of the container 3. Apart from the suction cups 4_a_, 4_b_, the elements of the manipulator are not shown 1. The manipulator 1 may for example comprise a separating element in the form of an electric or pneumatic actuator that translatively moves the suction cups 4_a_, 4_b_.

Figure 7:
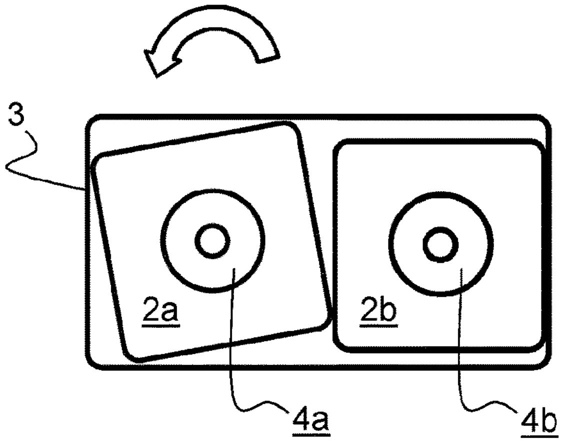
FIG. 7 illustrates an alternative to method step 3*c* in a top view.

FIG. 7 schematically illustrates an embodiment in which the first suction cup 4_a_, and thus the first object 2_a_, is rotated around a vertical axis to internally press against and lift the container 3. Apart from the suction cups 4_a_, 4_b_, the elements of the manipulator are not shown 1. The manipulator 1 may for example comprise a separating element in the form of an electric or pneumatic actuator that rotates the first suction cup 4_a_. Alternatively, the first suction cup 4_a_ may be rotatably journalled on thread means, such that the suction cup 4_a_ is rotated by the weight of the object 2_a_. As an alternative embodiment, both the first and the second suction cups 4_a_, 4_b_ are counter-rotated around their vertical axes.

In the embodiments shown in FIGS. 1-5, the container is secured by the objects, by forcing apart the first and second objects, and is also lifted by the objects in one single lifting movement.

In the above embodiments there are shown either four or two objects placed on or in a container. As will be understood, this disclosure does not exclude that there may be additional objects on or in the container, which are not gripped by the suction cups.

The invention claimed is:

1. A manipulator for lifting objects and an upwards open container within which the objects are at least partly arranged, the manipulator comprising:

a first object engaging device comprising at least one vacuum suction gripper configured to engage a first object;

a second object engaging device comprising at least one vacuum suction gripper configured to engage a second object;

a flexible separating member for carrying at least one of the first and second object engaging devices and forcing the first and second objects apart when engaged by at least one of the first and second object engaging devices being carried, such that the first and second objects exert an internal force on the container whereby the container is lifted by the first and second objects by frictional forces between the first and second objects and the container;

a rigid hoist member configured to carry the flexible separating member; and connectors connecting the rigid hoist member and the flexible separating member;

wherein the flexible separating member is suspended below the rigid hoist member by the connectors in a vertically movable manner between a first distance and a second distance, the second distance being greater than the first distance, and is configured to deform under the weight of the first object or the second object being engaged, without active actuation, to force the first and second objects apart at least partly in a horizontal direction.

2. The manipulator of claim 1, wherein the flexible separating member is configured to force a bottom of the first and second objects apart.

3. The manipulator of claim 2, wherein the flexible separating member is configured to rotate the first and second objects around a respective horizontal axis ($Z_a$, $Z_b$).

4. The manipulator of claim 3, wherein the manipulator is configured such that the horizontal axes are located above the first and second objects.

5. The manipulator of claim 4, wherein the flexible separating member includes a flexible plate, and wherein the manipulator is configured such that the flexible separating member deforms by the weights of said first and second objects when lifted by the manipulator.

6. The manipulator of claim 4, wherein each of the connectors allows the flexible separating member to deform by weights of the first and second object when lifted by the manipulator.

7. The manipulator of claim 6, wherein the flexible separating member and/or the rigid hoist member is/are plate-shaped element(s), bar-shaped element(s), rod-shaped elements(s) or formed from a grid of bars or rods.

8. The manipulator of claim 7, comprising:

a contact sensor for determining contact between the manipulator and an object, wherein the contact sensor is configured to sense a distance between the flexible separating member and the rigid hoist member.

9. A robot comprising:

the manipulator of claim 8; and a robot structure to which the manipulator is connected.

10. The manipulator of claim 3, wherein the flexible separating member is rotationally and firmly attached to the first and second object engaging devices such that rotation of a portion of the flexible separating member transfers torque to the first and second object engaging devices.

11. The manipulator of claim 1, wherein the flexible separating member comprises a flexible plate configured to elastically deform under the weight of the first and second objects when lifted by the manipulator.

12. The manipulator of claim 1, wherein the connectors allows relative movement between the flexible separating member and the rigid hoist member such that deformation of the flexible separating member occurs under the weight of the first and second objects.

13. The manipulator of claim 1, wherein the flexible separating member and/or the rigid hoist member is/are plate-shaped elements(s), bar-shaped element(s), rod-shaped element(s), or formed from a grid of bars or rods.

14. The manipulator of claim 1, further comprising a contact sensor for determining contact between the manipulator and the first or second object, wherein the contact sensor is configured to sense a distance between the flexible separating member and the rigid hoist member.

15. The manipulator of claim 1, wherein a footprint of the manipulator is smaller than a footprint of a container for which the manipulator is configured to lift.

16. The manipulator of claim 1, in combination with first and second objects to be lifted, wherein the manipulator comprises:

at least two first object engaging devices; and at least two second object engaging devices, wherein the first object is engaged by at least two first object engaging devices and the second object is engaged by at least two second object engaging devices.

17. A robot comprising:

the manipulator of claim 1; and a robot structure to which the manipulator is connected.

18. The manipulator of claim 1, wherein the flexible separating member is configured to rotate first and second objects around a respective horizontal axis ($Z_a$, $Z_b$).

19. The manipulator of claim 1, wherein the first and second object engaging devices comprise vacuum suction grippers configured to engage a topside of the first and second objects.

20. The manipulator of claim 1, wherein the flexible separating member is configured to deform into a bowl shape when lifting the objects, such that a lower surface of the flexible separating member is convex as viewed from below.

21. The manipulator of claim 1, wherein the flexible separating member is suspended below the hoist member by the connectors in a vertically movable manner between a first distance and a second distance, the second distance being greater than the first distance.

22. A method for lifting objects and an upwards open container within which the objects are at least partly arranged, the method comprising:

engaging a first object by a first object engaging device;

engaging a second object by a second object engaging device;

securing the container to the first and second objects by forcing apart, at least partly in a horizontal direction, the first and second objects by deformation of a flexible separating member under the weight of the objects without active actuation, wherein the flexible separating member is suspended below a rigid hoist member by connectors in a vertically movable manner between a first distance and a second distance, the second distance being greater than the first distance, and wherein the flexible separating member moves relative to the rigid hoist member from the first distance toward the second distance under the weight of the objects; and lifting the objects and the container, whereby the container is lifted by the first and second objects by frictional forces between the first and second objects and the container, the movement of the flexible separating member relative to the rigid hoist member from the first distance toward the second distance causing the deformation that forces the first and second objects apart at least partly in the horizontal direction.

* * * * *